United States Patent [19]

Sokolov et al.

[11] 4,372,121
[45] Feb. 8, 1983

[54] POWER-PLANT

[76] Inventors: Sergei S. Sokolov, ulitsa Nevzorovoi, 6, kv. 67; Vadim R. Komovsky, ulitsa Novoligovskaya, 13, kv. 53; Leonid I. Vlasov, Drezdenskaya ulitsa, 18, kv. 18; Boris M. Boretsky, ulitsa Furmanova, 14, kv. 46; Grigory V. Shiryaev, ulitsa Matrosa Zheleznyaka, 53, kv. 60, all of Leningrad, U.S.S.R.

[21] Appl. No.: 244,076

[22] Filed: Mar. 16, 1981

[51] Int. Cl.³ .................... F02B 37/00; F02D 23/00
[52] U.S. Cl. ........................................................ 60/606
[58] Field of Search ............... 60/606, 600, 611, 615, 60/617, 619, 598, 599, 614

[56] References Cited

U.S. PATENT DOCUMENTS

| | | | |
|---|---|---|---|
| 2,379,455 | 7/1945 | Prince | 60/606 |
| 2,654,991 | 10/1953 | Nettel | 60/606 |
| 3,096,615 | 7/1963 | Zuhn | 60/606 |
| 3,232,044 | 2/1966 | Gratzmuller | 60/606 |
| 3,676,999 | 7/1972 | Oldfield | 60/606 |
| 3,996,747 | 12/1976 | Melchior | 60/606 |
| 4,018,053 | 4/1977 | Rudert et al. | 60/606 |
| 4,078,387 | 3/1978 | Melchior et al. | 60/606 |
| 4,089,173 | 5/1978 | Melchior et al. | 60/606 |
| 4,287,717 | 9/1981 | Oldfield et al. | 60/606 |

FOREIGN PATENT DOCUMENTS 2041084  9/1980  United Kingdom ............... 60/606

OTHER PUBLICATIONS

S.A.E. Publication 740723 Sep. 9, 1974, eighteen pages.

Primary Examiner—Wendell E. Burns
Attorney, Agent, or Firm—Lilling & Greenspan

[57] ABSTRACT

Disclosed is a power-plant comprising an internal-combustion engine, a turbo-charger providing the supercharging of said internal-combustion engine and having a turbine and a compressor whose outlet communicates with an inlet of the internal-combustion engine and, through a by-pass duct, with a turbine inlet communicating with an outlet of the internal-combustion engine. An air flow sensor is installed at an inlet of the compressor. Arranged in the by-pass duct are an auxiliary combustion chamber and an air flow rate adjusting device for the air by-passed from the compressor to the turbine. The air flow rate adjusting device incorporates a throttling member linked with a drive used to change the position thereof and is provided with a comparison unit having a first input, a second input, and an output. The first input of the comparison unit communicates with the by-pass duct between the compressor outlet and said air flow rate adjusting device, the second input of the comparison unit communicates with the air flow sensor, and the output is connected with said drive, the first input of the comparison unit being supplied with an input signal proportional to the compressed air pressure at the compressor outlet and the second input of the comparison unit being fed with an input signal proportional to the flow rate of the compressor intake air.

3 Claims, 3 Drawing Figures

FIG.2

POWER-PLANT

FIELD OF THE INVENTION

The present invention relates to engine building and, more particularly, to power-plants comprising an internal-combustion engine and a turbo-charger providing the supercharging of the former.

Most advantageously, the present invention can be used in vehicles and vessels, for example, in lorries, tractors, road-building machines, ships, prime movers.

BACKGROUND OF THE INVENTION

Internal-combustion engines without supercharging are known to have a high weight-to-power ratio as well as a high size-to-power ratio.

The power of an internal-combustion engine can be materially increased by its supercharging, i.e. by increasing the pressure of the air supplied to cylinders of the internal-combustion engine.

The internal-combustion engine supercharging can be accomplished with the use of supercharging units providing the compression of the air supplied to the internal-combustion engine. The most promising supercharging unit is the turbo-charger, whose turbine is not mechanically coupled with the internal-combustion engine crankshaft, while it is driving a compressor performing the compression of the air supplied to the internal-combustion engine. The use of these supercharging units will be discussed below.

A power-plant is a combination of an internal-combustion engine with a supercharging unit and other elements which are required to provide the supercharging. Such a power-plant allows the power of the internal-combustion engine included therein to be substantially increased along with a slight increase in its size, weight and cost as compared with non supercharged internal-combustion engine.

The presence of the turbo-charger in the power-plant may, however, lead to an increase in time required to change from a low power level to a higher one, to an abrupt decrease in the maximum torque of the internal-combustion engine shaft as the speed of said shaft is decreased, etc.

The principal disadvantage of a power-plant incorporating an internal-combustion engine with a high level of supercharging produced by a turbo-charger is a reduced range of permissible operating conditions of the internal-combustion engine, resulting from a compressor surging region that diminishes the range of the air flow rate of the compressor and, hence, that of the internal-combustion engine and causes a temperature rise of the exhaust gases at a reduced speed of the internal-combustion engine crankshaft up to the maximum permissible value for the materials of the internal-combustion engine components and assemblies. The most efficient and reliable means for expanding the range of permissible operating conditions of the internal-combustion engine is to provide the power-plant with an auxiliary combustion chamber arranged in the by-pass duct communicating the compressor outlet with the turbine inlet and by-passing the compressed air not used by the internal-combustion engine from the compressor outlet to the turbine inlet through the auxiliary combustion chamber.

This can provide the compressor operation outside the surging region, ensuring the independence of the amount of air supplied by the compressor and the flow rate of the air consumed by the internal-combustion engine.

Furthermore, the auxiliary combustion chamber and the by-pass duct maintain such a compressor outlet pressure that provides the maximum permissible value of exhaust gas temperature under any operating conditions of the internal-combustion engine.

DESCRIPTION OF THE PRIOR ART

In accordance with the article "Hyperbar System of High Supercharging" by Melchior J., Andre-Talaman F., S.A.E. Paper No. 740723, Sept. 9–12, 1974, p. 18, the power-plant comprising an auxiliary combustion chamber used for heating the by-pass air operates reliably and efficiently provided the performance characteristic curve of the compressor lies in the vicinity of the surging boundary in the region of maximum compressor efficiency, the gas termperature upstream of the turbine and at the internal-combustion engine outlet not exceeding a certain pre-determined value permissible from the viewpoint of the thermal load for the internal-combustion engine component.

It is also known (cf., for example, K. Zinner "Internal-Combustion Engine Supercharging", translation from German, Leningrad, Publishing House "Mashinostroenie", 1978) that the surging boundary of the compressor is adequately approximated by a square parabola given by $$Pc - Po = k\, Gc^2, \qquad (1)$$

where
- $Pc$ = compressed air pressure at the compressor outlet or pressure of the air supplied to internal-combustion engine cylinders;
- $Po$ = atmospheric pressure;
- $Gc$ = air flow rate at the compressor inlet;
- $k$ = proportionality factor depending upon the particular construction of the compressor and the power-plant.

It is also widely known that the region of the compressor maximum efficiency is situated in the vicinity of the surging boundary.

The characteristic curves of the turbo-charger representing Pc versus Gc at constant temperatures of gases at the turbo-charger turbine inlet are also approximated by parabolas described by Equation (1), for a given construction of the turbo-charger the proportionality factor, k, depending chiefly upon said temperature. One can attain, by selecting proper construction elements of the power-plant, that at the constant maximum temperature (as to the thermal load of turbine components) the characteristic curve of the turbo-charger lies in the vicinity of the surging boundary. This can be ascertained, for example, from the USSR Pat. No. 579 933, Cl. F02B 37/00, patented in 1977.

Thus, if the performance characteristic curve of the compressor, representing the compressed air pressure at the compressor outlet as a function of the flow rate of the air passing therethrough, is defined by Equation (1) and the proportionality factor "k" is so selected that the performance characteristic curve lies in the vicinity of the surging boundary, while the construction of the power-plant provides the gas temperature at the turbine inlet approximately constant and not exceeding the maximum permissible value, then the power-plant will operate efficiently and reliably.

Known in the prior art is a power-plant (cf. U.S. Pat. No. 3,676,999, U.S. Cl 60/13, patented on July 18, 1972) comprising an internal-combustion engine, a turbo-charger providing the supercharging of said internal-combustion engine and having a turbine and a compressor whose outlet communicates with an inlet of the internal-combustion engine and, by means of a by-pass duct, with the inlet of said turbine, which communicates with the internal-combustion engine outlet, a dump valve and an auxiliary combustion chamber inserted into the by-pass duct.

The power-plant mentioned hereinabove operates in the following manner.

Prior to the starting of the internal-combustion engine the rotation of the turbo-charger is initiated. The compressed air from the compressor is supplied through the by-pass duct to the auxiliary combustion chamber, is mixed with the atomized fuel injected thereinto and burns therein, and is fed to the turbine.

Thus, the turbo-charger is started as a closed-loop gas turbine plant. As soon as the pressure and temperature of the compressed air at the turbine inlet reach the values adequate to initiate the ignition of the fuel injected into the cylinders of the internal-combustion engine the engine is started.

In the course of the internal-combustion engine starting and during its idle running or running close to the idle running, supplied to the turbine inlet are combustion products from the auxiliary combustion chamber and exhaust gas from the internal-combustion engine. When the internal-combustion engine is turned on to run under a load, the by-pass duct is shut-off by the dump valve.

At the same time it is known that internal-combustion engines with a compression ratio below 11 are unreliable in starting and operate unstably under low loads, while at a compression ratio considerably lower than 11 the internal-combustion engine starting becomes generally impossible because the temperature of the compressed air in the cylinders of the internal-combustion engine will be, in this event, lower than the self-ignition temperature of the fuel supplied thereto.

This power-plant allows such conditions to be produced at the internal-combustion engine inlet that provide the reliable starting thereof and running at a low torque and the idle running not depending upon the compression ratio of the internal-combustion engine. Due to the fact that a low-compression ratio internal-combustion engine can be used in this power-plant, the pressure of the air supplied into the cylinders may be substantially increased and, hence, the internal-combustion engine power at the maximum speed of its shaft may be also increased, thermal and mechanical stresses of its components being maintained at almost constant level.

However, in this power-plant the by-pass duct and the auxiliary combustion chamber are used only to adjust the pressure of the air supplied to the cylinders of the internal-combustion engine at its starting, its idle running and its low torque shaft running. Under other operating conditions of the power-plant, it will have the disadvantages listed hereinabove and inherent in the power-plant where the internal-combustion engine supercharging is accomplished by a turbo-charger without the use of the by-pass duct and the auxiliary combustion chamber.

Also known in the prior art is a power-plant (cf. Swiss Pat. No. 565 940, Cl. FO2B 37/00, patented in 1975) comprising an internal-combustion engine, a turbo-charger providing the supercharging of the internal-combustion engine and having a turbine and a compressor whose outlet communicates with an inlet of the internal-combustion engine and, by means of a by-pass duct, with an inlet of said turbine, that is also connected with an outlet of the internal-combustion engine, an auxiliary combustion chamber being installed in the by-pass duct. Furthermore, unlike the above-mentioned power-plant in accordance with U.S. Pat. No. 3,676,999, the by-pass duct of this power-plant is provided with a device for adjusting the flow rate of the air by-bassed from the compressor to the turbine and not used by the internal-combustion engine instead of the dump valve. The air flow rate adjusting device comprises a throttling member linked with a drive used to change its position. The drive is made as a cavity communicating with the by-pass duct. One of the cavity walls, linked with the throttling member, is made movable. As the by-pass duct pressure is increasing, the movable drive wall moves and displaces the throttling member towards the reduction of the by-pass duct clear opening. The throttling member is subject to the action of a force proportional to the pressure differential on it.

The air flow rate adjusting device provided in the by-pass duct of this power-plant allows the by-pass duct and the auxiliary combustion chamber to be used to adjust the compressed air pressure at the compressor outlet over the whole range of operating conditions of the internal-combustion engine, or, in other words, in this power-plant it is possible to enhance the compressed air pressure at the compressor outlet and, hence, the torque derived from the crankshaft of the internal-combustion engine over the whole range of crankshaft speeds.

The combination of the air flow rate adjusting device and the drive used to change the position of its throttling member, however, is an oscillator liable to self-excitation. On one hand, the throttling member is acted upon by a force proportional to the pressure differential of the air upstream and downstream of it, on the other hand, the movable drive wall is acted upon by a force proportional to the air pressure in the by-pass duct upstream of the throttling member. The applied forces pulsate and do not balance each other. This leads to the fact that under certain operating conditions of the internal-combustion engine this oscillator can be drawn into resonance, causing instability of the aerodynamical flow in the by-pass duct, which in turn can result in the compressor surging, the instable operation of the auxiliary combustion chamber, capable to lead to flame blowoff therein and, consequently, to a drop of pressure of the air supplied to the cylinders of the internal-combustion engine, resulting in an overheating of its components. Thus, the reliability of this power-plant is not provided.

Also known in the prior art is a power-plant (cf. USSR Pat. No. 579 933, Cl. FO2B 37/00, patented in 1977), comprising an internal-combustion engine, a turbo-charger providing the supercharging of the internal-combustion engine and having a turbine and a compressor whose outlet communicates with an inlet of the internal-combustion engine and, by means of a by-pass duct, with an inlet of said turbine, that is connected with an outlet of the internal-combustion engine, the by-pass duct being provided with a device used for adjusting the flow rate of the air by-passed from the compressor outlet to the turbine inlet and with an auxiliary combustion chamber. The air flow rate adjusting device comprises a throttling member made as a damper and rigidly linked with a lever. This air flow rate adjusting device is provided with a drive displacing its throttling member. The drive is made as a servomotor having a cylinder with a bore wherein a piston with a rod hinged with the lever of the throttling member is accommodated. The piston divides the inner cylinder bore into a first cavity communicated with a pump supplying a power liquid thereinto and a second cavity with a return spring arranged therein.

The air flow rate adjusting device is provided with a comparison unit.

Said comparison unit comprises a casing incorporating a first cylinder and a second cylinder adjoining each other. The casing encloses a movable member having two pistons linked by a rod. The diameter of the piston in the first cylinder is larger than that of the piston in the second cylinder. The larger-diameter piston separates a cavity in the first cylinder of the casing which cavity communicates with the by-pass duct on its portion downstream of the throttling member in the by-pass duct.

The cavity of the comparison unit casing arranged between the large-diameter piston and the smaller-diameter piston communicates with the by-pass duct on the portion thereof between the compressor outlet and an inlet of the air flow rate adjusting device. Thus, the pressure of the compressed air supplied to the cylinder cavity formed in the cylinder by the larger-diameter piston is equal to the pressure of the compressed air in the by-pass duct downstream of the throttling member of the air flow rate adjusting device, whereas the pressure of the compressed air supplied to the cavity between the larger-diameter piston and the smaller-diameter piston is equal to the compressed air pressure in the by-pass duct upstream of the throttling member of the air flow rate adjusting device. In other words, one input of the comparison unit is supplied with an input signal that is the compressed air pressure downstream of the air flow rate adjusting device, whereas another input of the comparison unit is fed with an input signal that represents the compressed air pressure at the compressor outlet.

Moreover, the second cylinder of the comparison unit casing is provided with a partition fitted with a jet where a movable needle rigidly coupled with the smaller-diameter piston of the movable member of the comparison unit enters. Through the clearance formed between the movable needle and the jet and determining the clear opening of the latter, the power liquid can pass to be discharged from the first cavity of the cylinder of the drive used to change the position of the throttling member. Thus, one may say that the clearance formed between the movable needle and the jet is an output of the comparison unit and that the output signal providing the displacement of a drive piston is a value of flow rate of the power liquid passing through the jet for discharging.

Furthermore, there is a cavity in the inner bore of the second cylinder, where a return spring is located to act upon the smaller-diameter piston so as to enlarge the clear opening of the jet, the cavity communicating with the atmosphere.

Under steady-state operating conditions of the power-plant, the throttling member of the air flow rate adjusting device is acted upon by a steady-state compressed air pressure differential, said compressed air pressure differential being equal to the difference between the compressed air pressure upstream of the throttling member and the compressed air pressure downstream of it or to the difference between the compressed air pressure at the compressor outlet and the compressed air pressure at the outlet of the air flow rate adjusting device. The larger-diameter piston of the movable member of the comparison unit is acted upon by a force proportional to the compressed air pressure differential on the throttling member of the air flow rate adjusting device. The smaller-diameter piston is acted upon by the force proportional to the compressed air pressure, upstream of the throttling member on one hand and by the force proportional to the atmospheric pressure on the other. The resulting force that is the sum of said forces acting upon the movable member of the comparison unit is balanced by the force of the return spring. The position of the needle with respect to the jet determines the clear opening area thereof that corresponds to the compressed air pressure differential on the throttling member. A portion of the power liquid passes from the first cavity of the drive cylinder through the clearance between the movable needle and the jet for discharging. The power liquid pressure acting on the drive piston is thus determined by said compressed air pressure differential on the throttling member.

When the operating conditions of the power-plant are changed, for example, when the internal-combustion engine crankshaft torque is increased, the compressed air pressure at the compressor outlet is increased respectively. The compressed air pressure differential on the throttling member is increased respectively as well. In this event, in the cavity formed by the larger-diameter piston and in the cavity formed between the larger-diameter piston and the smaller-diameter piston of the comparison unit the pressures of the air supplied thereto are changed. Due to this fact the resulting air pressure force acting on the movable member of the comparison unit is decreased, the resulting force becoming lower than the return spring force in the comparison unit. As a result, the return spring of the comparison unit displaces the movable member with the needle towards the increase in the clear opening of the jet, thus increasing the flow rate of the power liquid fed from the first cavity of the drive cylinder through the jet for discharging. This leads to a reduction of the power liquid pressure in the first cavity of the drive cylinder. The force of the return spring arranged in the second cavity of the drive cylinder exceeds the force proportional to the power liquid pressure in the first cavity of the cylinder. Thus, the return spring displaces the piston and, through the rod and the lever, the throttling member which, rotating, changes the clear opening area of the by-pass duct. The air pressure differential is, thus, changed on the throttling member. The displacement of the throttling member will take place until the pressure differential corresponding to the new value of the compressed air pressure at the compressor outlet is achieved. In this event, the pressure differential on the throttling member depends upon not the flow rate of the air by-passed through the by-pass duct, but only the compressed air pressure at the compressor outlet as given by $$\Delta P_1 = aPc + b, \qquad (2)$$

where

ΔP₁ = pressure differential on the air throttling means;
Pc = air pressure at the compressor outlet;
a and b = constant factors defined by the particular construction of this power-plant.

The compressor performance characteristic curve of the power-plant is maintained by the linear variation of the pressure differential on the throttling member with the compressed air pressure at the compressor outlet in accordance with Equation (2).

In this power-plant the position of the throttling member does not depend upon the forces proportional to air pressures upstream and downstream of the air flow rate adjusting device and acting directly on the surface of its surface of its throttling member. The position of the throttling member is given by the drive depending upon the output signal of the comparison unit, thus improving the stability of the throttling member against variations of the pressure and the flow rate of the air passing therethrough. This allows the operating reliability of this power-plant to be improved as compared to that of the power-plant in accordance with U.S. Pat. No. 3,676,999 as described hereinabove.

However, in this power-plant the maintenance of the compressor performance characteristic curve that is practically only a linear dependence of the compressed air pressure at the compressor outlet upon the flow rate of the air passing through the compressor is provided by the use of input signals proportional to the air pressure upstream and downstream of the throttling member and employed by the comparison unit to generate an output signal that varies depending upon the difference between the existing pressure differential and the required pressure differential in accordance with Equation (2) and proportionally to the existing compressed air pressure at the compressor outlet. This leads to the compressor performance characteristic curve not lying equidistantly with respect to the surging boundary, but either enters the region of low efficiencies of the compressor which leads to an impairing of the power-plant efficiency and reliability or passes to the compressor surging region which leads to vibration and fracture of compressor components, flame blowoff in the auxiliary combustion chamber and overheating of the internal-combustion engine.

A device used for correcting the shape of the compressor performance characteristic curve, made as a throttle and employed in the described construction of the power-plant, does not provide the required accuracy of maintaining the operating conditions of the compressor since it is impossible to adjust precisely the throttle under the conditions of air pulsation in the by-pass duct and varying temperature of exhaust gas of the internal-combustion engine as the power-plant is operating. The use of the correcting device substantially impairs the reliability of the power-plant as a whole.

Furthermore, the varying value of the air pressure downstream of the throttling member, that is an input signal of the comparison unit, is a parameter depending upon the operating conditions of the auxiliary combustion chamber and internal-combustion engine. This fact also materially contributes to the reduction in the accuracy of maintenance of the desired operating conditions of the compressor, which in turn may cause the operation of the compressor in the surging region and overheating of power-plant components.

Thus, the disadvantages discussed hereinabove make this power-plant unreliable and inefficient.

SUMMARY OF THE INVENTION

It is an object of the present invention to provide a power-plant featuring a high reliability.

With this and other objects in view there is proposed a power-plant comprising an internal-combustion engine, a turbo-charger providing the supercharging of said internal-combustion engine and having at least one turbine and one compressor whose outlet communicates with an inlet of the internal-combustion engine and, by means of a by-pass duct, with an inlet of said turbine. The turbine communicates with an outlet of the internal-combustion engine. Arranged in the by-pass duct is an auxiliary combustion chamber and a device for adjusting the flow rate of the air by-passed from the compressor to the turbine. The flow-rate adjusting device has a throttling member linked with a drive used for changing the position thereof and is provided with a comparison unit having a first input, a second input and an output that communicates with the drive, the first input of the comparison unit being connected with the by-pass duct between the compressor outlet and the air flow rate adjusting device. In accordance with the present invention, the power-plant is further provided with an air flow sensor installed at the compressor inlet and communicating with the second input of the comparison unit.

The air flow sensor installed at the compressor inlet and communicating with said comparison unit allows the actual flow rate of the air supplied to the compressor inlet to be measured. An input signal proportional to the flow rate of the air passing through the compressor is applied from the air flow sensor to the comparison unit where this input signal is compared with another input signal proportional to the air pressure at the compressor outlet. As a result of the comparison of the input signals, the comparison unit delivers an output signal to the drive determining the position of the throttling member, depending upon both the compressed air pressure upstream of the throttling member and the air flow rate at the compressor inlet.

So, for example, at a constant speed of the crankshaft and at a constant air pressure at the compressor outlet and with an abrupt variation of the air flow rate at the compressor inlet, the comparison unit delivers a new commanding output signal leading to a change in the position of the throttling member of the air flow rate adjusting device and, hence, to a change in the flow rate of the air by-passed through the by-pass duct, and this results in a change of the air flow rate at the compressor inlet, whose value will again strictly correspond to a given air pressure at the compressor outlet, the value of the air pressure at the compressor outlet and the air flow rate corresponding to a given performance characteristic curve of the compressor. This provides a strict maintenance of predetermined operating conditions of the compressor.

For example, when the speed of the crankshaft and its torque are decreased, the compressed air pressure at the compressor outlet is reduced, the flow rate of the air consumed by the internal-combustion engine being decreased. The comparison unit delivers an output signal to change the position of the throttling member, causing a change in the flow rate of the air by-passed through the by-pass duct.

This leads to a reduction in the flow rate of the air supplied to the compressor, this reduction being not proportional to the reduction in the flow rate of the air consumed by the internal-combustion engine. The new value of the flow rate of the air supplied to the compressor will correspond to the new steady-state pressure of the compressed air at the compressor outlet in accordance with the Equation (1). Thus, the independence of the operating conditions of the compressor and the operating conditions of the internal-combustion engine is achieved.

It is advisable that the air flow sensor should be made as a nozzle with a passage having a converging inlet portion, a through hole communicating with said second input of the comparison unit being made in the probe wall downstream of the input portion of the passage.

Such a construction of the air flow sensor is simple and has a long service life.

In cases where the vehicle fitted with this power-plant operates under heavy air contamination conditions and severe limitations are placed upon the power-plant as to the maximum level of noise, it is necessary that the air flow sensor comprises a nozzle, two bellows, an assembly for air supply to the bellows, and a clamp. The passage of the nozzle has an input portion with a silencer and a filter arranged therein, a converging middle portion, and an output portion. The assembly used to supply the air is located between the two bellows and is connected to the nozzle and has two passages, each communicating with the interior of one of the bellows. The clamp embraces the bellows so that each of the bellows has one of its end surfaces connected to the assembly for air supply while another end surface thereof is connected to the clamp. Made in the nozzle wall are a hole disposed upstream of the middle portion of the nozzle passage, that communicates with one of the passages of the air supply assembly, and a hole disposed downstream of the middle portion of the nozzle passage, communicating with the other passage of the air supply assembly.

With such a design of the air flow sensor, the signal applied therefrom to the second input of the comparison unit represents the displacement of the clamp embracing the bellows, the clamp displacement being proportional to the air pressure difference in the probe passage upstream and downstream of its middle portion, that is in turn proportional to the air flow rate at the compressor inlet.

During the operation of the power-plant the resistances of the silencer and filter increase, the air flow rate at the compressor inlet being constant, but the passage provided in the air supply assembly and communicating the input portion of the nozzle passage with the interior of one of the bellows allows the increase in said resistances to be compensated. This permits applying the input signal whose value is strictly determined by the air flow rate at the compressor inlet to the second input of the comparison unit.

BRIEF DESCRIPTION OF THE DRAWINGS

These and other objects and advantages of the present invention will become fully apparent from the following description taken in conjunction with the accompanying drawings wherein.

DETAILED DESCRIPTION OF THE INVENTION

Figure 1:
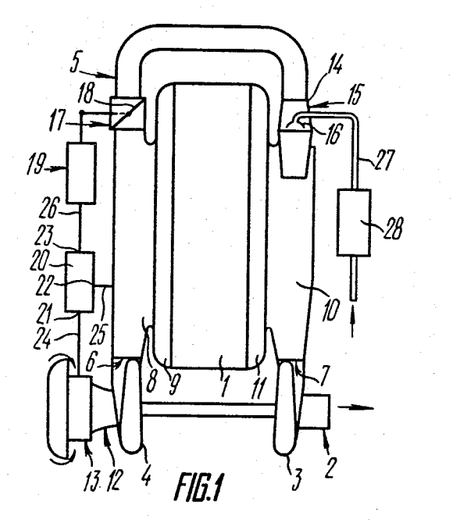
FIG. 1 shows schematically the power-plant, in accordance with the present invention.

Referring to the accompanying drawings and initially to FIG. 1, the power-plant comprises an internal-combustion engine 1, a turbo-charger 2 having a turbine 3 and a compressor 4 linked by a single shaft, a by-pass duct 5 coupling an outlet 6 of the compressor 4 with an inlet 7 of the turbine 3.

An inlet manifold 8 communicates the outlet 6 of the compressor 4 with an inlet 9 of the internal-combustion engine 1 through the by-pass duct 5; and, an outlet manifold 10 communicates an outlet 11 of the internal-combustion engine 1 with the inlet 7 of the turbine 3 likewise through the by-pass duct 5.

Installed at an inlet 12 of the compressor 4 is an air flow sensor 13 for the air supplied to the compressor 4.

A portion of the by-pass duct 5 is used as a housing 14 of an auxiliary combustion chamber 15 incorporating an injection nozzle 16. Arranged ahead of an inlet of the auxiliary combustion chamber 15 in the by-pass duct 5 is an air flow rate adjusting device 17 for the air by-passed from the compressor 4 to the turbine 3 and not used by the internal-combustion engine 1. The air flow rate adjusting device 17 is provided with a throttling member 18 linked with a drive 19 ensuring a change of its position inside the by-pass duct 5.

Furthermore, said aid flow rate adjusting device 17 is coupled with a comparison unit 20 having two inputs 21 and 22 and an output 23, the input 21 communicating with the air flow sensor 13 through an input signal transmission line 24 and the input 22 communicating with the outlet 6 of the compressor 4 through an input signal transmission line 25 and the by-pass duct 5. The output 23 of the comparison unit 20 is coupled by a commanding output signal transmission line 26 with the drive 19.

The injection nozzle 16 of the auxiliary combustion chamber 15 is coupled by a pipeline 27 with a flow rate adjusting device 28 for the fuel supplied to the auxiliary combustion chamber 5.

Figure 2:
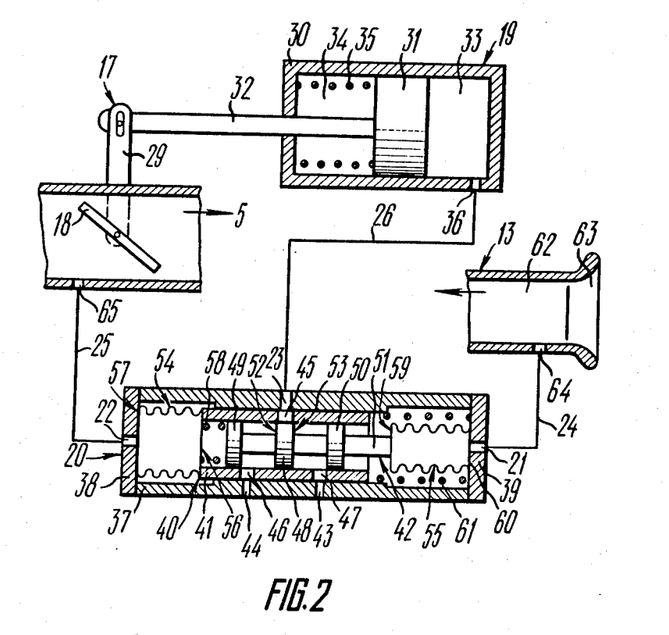
FIG. 2 is a schematic view, partially in section, of a portion of the by-pass duct, showing the air flow rate adjusting device with the throttling member, the drive used for changing the position of the throttling member, the air flow sensor and the comparison unit arranged therein.

Referring now to FIG. 2, there are shown the air flow rate adjusting device 17 arranged in the by-pass duct 5 (the by-pass duct 5 being shown partially in FIG. 2), the drive 19, the air flow sensor 13 installed at the inlet 12 of the compressor (not shown), and the comparison unit 20. The air flow rate adjusting device 17 comprises the throttling member 18 mentioned hereinabove and made as a damper, and a lever 29 rigidly coupled with the throttling member 18. The drive 19 is a servo-motor having a cylinder 30 with an inner bore where a piston 31 with a rod 32 are arranged. The piston 31 divides the inner bore of the cylinder 30 into a cavity 33 and a cavity 34. The cavity 34 of the cylinder 30 accommodates a return spring 35. The rod 32 is hinged with the lever 29 of the air flow rate adjusting device 17. Made in the wall of the cylinder 30 is a hole 36 used to supply a power liquid to the cavity 33. The comparison unit 20 incorporates a housing 37 with covers 38 and 39 connected thereto. Arranged inside the housing 37 is a slide valve 40 having a bushing 41 and a plunger 42.

The reference numerals 21 and 22 shown earlier in FIG. 1 are used to indicate the inputs of the comparison unit 20, and refer to holes made respectively in the covers 39 and 38 of the housing 37. The reference numeral 23 shown earlier in FIG. 1 is used to indicate the output of the comparison unit 20, that is, a hole made in the housing 37. Furthermore, holes 43 and 44 are made in the housing 37.

The hole 43 is intended to supply the power liquid to the comparison unit 20 whereas the hole 44 is intended to discharge the power liquid therefrom.

Made in the bushing 41 are holes 45, 46 and 47. The plunger 42 has a working collar 48 and two sealing collars 49 and 50 and a stem 51. The working collar has working surfaces 52 and 53. The housing 37 encloses input signal converters 54 and 55 made as bellows. An end surface 56 of the input signal converter 54 bears up against the bushing 41, and the other end surface 57 of the input signal converter 54 is hermetically fitted to the cover 38. Arranged between the end surface 56 of the input signal converter 54 and the sealing collar 49 of the plunger 42 is a return spring 58. An end surface 59 of the converter 55 bears up against the stem 51 of the plunger 42. Another surface 60 of the converter 55 is hermetically fitted to the cover 39. A return spring 61 is located between the cover 39 and the bushing 41.

The air flow sensor 13 is a nozzle having a passage 62 having a converging input portion 63. Made in a wall of the air flow sensor 13 downstream of the input portion 63 is a hole 64.

A hole 65 is made in the by-pass duct 5.

The hole 65 communicates with the input 22 of the comparison unit 20 through the input signal transmission line 25 made as a pipeline and illustrated earlier in FIG. 1. Thus, the interior of the input signal converter 54 communicates through the by-pass duct 5 with the outlet 6 of the compressor 4.

The hole 64 of the air flow sensor 13 communicates with the input 21 of the comparison unit 20 through the input signal transmission line 24 made as a pipeline and illustrated earlier in FIG. 1. Thus, the interior of the input signal converter 55 communicates with the passage 62 of the air flow sensor 13. The hole 36 made in the wall of the cylinder 30 of the drive 19 communicates with the output 23 of the comparison unit 20 through the control output signal transmission line 26 made as a pipeline and illustrated earlier in FIG. 1. Thus, the cavity 33 of the cylinder 30 communicates with the output 23 of the comparison unit 20.

Referring now to FIGS. 1 and 2, the operation of the power-plant is as follows.

Under steady-state operating conditions of the power-plant, air is supplied to the compressor 4 through the air flow sensor 13 and the inlet 12 of the compressor 4 of the turbo-charger 2. The air compressed by the compressor 4 passes through the outlet 6 of the compressor 4 to the by-pass duct 5 and further through the inlet manifold 8 to the inlet 9 of the internal-combustion engine 1; a portion of the compressed air not used by the internal-combustion engine 1 is supplied through the air flow rate adjusting device 17, arranged in the by-pass duct 5, to the auxiliary combustion chamber 15. Furthermore, fuel is supplied from the fuel flow rate adjusting device 28 along the pipeline 27 to the auxiliary combustion chamber 15 where it is fed to the injection nozzle 16 used to atomize it. The atomized fuel burns in the auxiliary combustion chamber 15, and the combustion products are mixed with the compressed air. Then the compressed air containing the combustion products passes through an outlet of the auxiliary combustion chamber 15 to the inlet 7 of the turbine 3 after it is mixed with the exhaust gas of the internal-combustion engine 1, supplied through the outlet manifold 10 from the outlet 11 of the internal-combustion engine 1 to the by-pass duct 5.

The input signal proportional to the flow rate of the air supplied to the compressor 4 is applied from the air flow sensor 13 through the input signal transmission line 24 to the input 21 of the comparison unit 20. The input signal proportional to the compressed air pressure at the outlet 6 of the compressor 4 is applied through the input signal transmission line 25 to the input 22 of said comparison unit 20. The control output signal is fed from the output 23 of the comparison unit 20 through the control output signal transmission line 26 to the drive 19 linked with the throttling member 18 of the air flow rate adjusting device 17.

Discussed below is the operation of the air flow rate adjusting device 17 together with the drive 19, the air flow sensor 13 and the comparison unit 20 as shown in FIG. 2.

The power liquid from a pump (not shown) is supplied through the hole 43 made in the housing 37 of the comparison unit 20 and further through the hole 47 made in the bushing 41 to the cavity between the working collar 48 and the sealing collar 50. The compressed air is supplied from the by-pass duct 5 through the hole 65, along the input signal transmission line 25, through the input 22 in the cover 38 of the comparison unit 20 to the interior of the input signal converter 54 in the comparison unit 20. Thus, the input signal fed to the input signal converter 54 is the compressed air pressure at the outlet 6 of the compressor 4 or the compressed air pressure upstream of the throttling member 18 in the by-pass duct 5.

The air flow passing through the converging input portion 63 of the passage 62 of the air flow sensor 13 is accelerated. This results in an air pressure drop with respect to the atmospheric pressure, Po, as the air is passing through the input portion 63 of the passage 62. At the position of the hole 64 in the wall of the air flow sensor 13 the air pressure, Pp, is equal to the difference between the atmospheric pressure, Po, and the air pressure drop, $\Delta p$. At the same time the air pressure drop, $\Delta p$, may be expressed by the following relationship, namely $$\Delta p = m\, Gc^2, \tag{3}$$

where m = proportionality factor;
Gc = flow rate of the air supplied to the compressor.

Thus, the other signal supplied to the input signal converter 55 of the comparison unit 20 is the air pressure, Pp, in the output portion of the passage 62 of the air flow sensor 13, whose value is proportional to the flow rate, Gc, of the air supplied to the compressor 4.

The law of adjustment of the flow rate of the air supplied to the compressor 4 can be derived from Equations (1) and (3) and is as follows:

$$(Pc - Po)/\Delta p = \text{const}. \tag{4}$$

This relationship defines the performance characteristic curve of the compressor 4 in this power-plant.

Under the steady-state conditions of the power-plant, the air pressure, Pp, in the output portion of the passage 62 of the air flow sensor 13 will correspond to the existing compressor air pressure, Pc, at the outlet 6 of the compressor 4, when the values of both are in accordance with Equation (4), the working collar 48 of the plunger 42 shutting off the hole 45 made in the bushing 41.

Under transient operating conditions of the power-plant, for example when the shaft torque of the internal-combustion engine 1 is increased, the compressed air pressure at the outlet 6 of the compressor 4 is increased as well, and the input signal converter 54 displaces the bushing 41 with respect to the plunger 42 of the slide valve 40. As a result of the compressed air pressure increase at the outlet 6 of the compressor 4 the flow rate of the air supplied through the air flow sensor 13 to the inlet 12 of the compressor 4 is increased. In this event this is equivalent to a decrease in the air pressure, Pp, at the output portion of the passage 62 of the air flow sensor 13 or, in other words, to an increase in the input signal fed to the input signal converter 55 of the comparison unit 20. When the air pressure, Pp, is decreased, the input signal converter 55 displaces the plunger 42 with respect to the bushing 41. As a result of the mutual displacement of the bushing 41 and the plunger 42 with respect to each other the working collar 48 of the latter is displaced with respect to the hole 45 made in the bushing 41. If the speed of the bushing 41 is higher than that of the plunger 42, a clearance determining the clear opening of the slide valve 40 is formed between the working surface 53 of the working collar 48 and the inner surface of the hole 45 made in the bushing 41. Through said clearance, the power liquid is fed from the cavity formed between the working collar 48 and the sealing collar 50 to the hole 45 made in the bushing 41 and further to the output 23 wherefrom the power liquid is supplied along the commanding output signal transmission line 26, through the hole 36 made in the wall of the cylinder 30 of the drive 19 to the cavity 33 of the cylinder 30. Then the piston 31 with the rod 32 is displaced to the left (see FIG. 2). Due to the displacement of the piston 31 with the rod 32, the lever 29 with the throttling member 18 of the air flow rate adjusting device 17 turns counter-clockwise, thus increasing the clear opening of the by-pass duct 5. Thus, an increase in the flow rate of the air supplied to the inlet 12 of the compressor 4 through the air flow sensor 13 leads to an increase in the flow rate of the compressed air by-passed from the compressor 4 to the turbine 3 and not used by the internal-combustion engine 1.

If the speed of the plunger 42 is higher than that of the bushing 41, as a result of the mutual displacement of the bushing 41 with respect to the plunger 42, a clearance is formed between the working surface 52 of the working collar 46 and the inner surface of the hole 45 made in the bushing 41. In this event the power liquid is fed from the cavity 33 of the cylinder 30 of the drive 19 through the hole 36, along the commanding output signal transmission line 26, through the output 23 of the comparison unit 20, the hole 45, said clearance to the cavity between the sealing collar 49 and the working collar 48, wherefrom the power liquid passes through the hole 46 made in the bushing 41 and the hole 44 for discharging. The return spring 35 displaces the piston 31 with the rod 42 to the right (see FIG. 2), and the lever 29, linked therewith, with the throttling member 18 is turned clockwise, thus reducing the clear opening of the by-pass duct 5, and as a result the flow rate of the compressed air by-passed from the compressor 4 to the turbine 3 through the air flow rate adjusting device 17 is reduced.

In this manner the comparison unit 20 compares the input signals, one of which is the compressed air pressure at the outlet 6 of the compressor 4 while the other input signal is the air pressure in the output portion of the passage 62 of the air flow sensor 13, whose value is proportional to the flow rate of the air supplied to the compressor 4. The input signal comparison process consists of the mutual displacement of the bushing 41 and the plunger 42 with respect to each other, while the output signal fed along the commanding output signal transmission line 26 to the drive 19 is represented by the value of the power liquid flow rate at the outlet 23 of the comparison unit 20.

Furthermore, the comparison unit 20 does not allow any significant departure of the operating conditions of the compressor from its performance characteristic curve given by Equation (4) when the operating conditions of the power-plant are transient.

Figure 3:
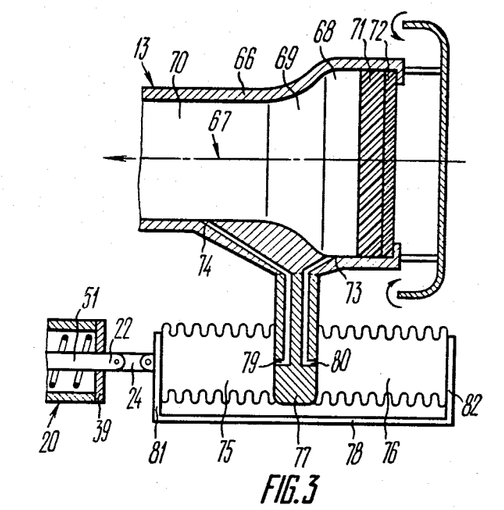
FIG. 3 is a schematic view, partially in section, of an alternative embodiment of the air flow sensor.

As is seen from FIG. 3, the air flow sensor 13 comprises a nozzle 66. A passage 67 of the nozzle 66 has an input portion 68, a middle portion 69, and an output portion 70. A filter 71 with a silencer 72 is installed within the input portion 68 of the passage 67, that is of the cylindrical shape. The middle portion 69 of the passage 67 is made converging, while the output portion 70 of the passage 67 is of cylindrical shape. A through hole 73 is made in the wall of the nozzle 66 behind the filter 71 and upstream of the middle portion 69 of the passage 67.

Furthermore, a through hole 74 is made in the wall of the nozzle 66 downstream of the middle portion 69 of the passage 67. The air flow sensor 13 comprises also two bellows 75 and 76, an air supply assembly 77 for air supply to the bellows 75 and 76, and a clamp 78. The air supply assembly 77 is arranged between the bellows 75 and 76 and is rigidly fitted to the nozzle 66 and has two passages 79 and 80. The clamp 78 embracing the bellows 75 and 76 is fitted with arms 81 and 82. The bellows 75 has one of its end surfaces secured to the arm 81 of the clamp 78 and the other end surface thereof is hermetically fitted to the air supply assembly 77. The bellows 76 has respectively one of its end surfaces secured to the arm 82 of the clamp 78 and the other end surface of the bellows 76 is hermetically fitted to the air supply assembly 77. The passage 79 of the air supply assembly 77 communicates with the interior of the bellows 75 and with the through hole 74 made in the wall of the nozzle 66; in such a manner the output portion 70 of the passage 67 communicates with the interior of the bellows 75. The passage 80 communicates respectively with the interior of the bellows 76 and with the through hole 73 made in the wall of the nozzle 66; in such a manner the input portion 68 of the passage 67 communicates with the interior of the bellows 76. In this embodiment of the air flow sensor 13, fitted to the arm 81 of the clamp 78 is a transfer member that is the input signal transmission line 24 used to transmit the input signal to the comparison unit 20. The input 22 of the comparison unit 20 is an end of the stem 51 of the plunger 42.

The air flow sensor 13 operates as follows.

The air sucked by the compressor 4 of the turbocharger 2 passes through the silencer 72 and the filter 71, the air being cleaned and the noise caused by the air suction being silenced. Then the air passes through the passage 67 to the inlet 12 of the compressor 4 (not shown in FIG. 3). The air pressure in the input portion 68 of the passage 67 is transferred through the through hole 73, along the passage 80, to the interior of the bellows 76. Moreover, the air pressure is transferred from the output portion 70 of the passage 67 through the through hole 74, along the passage 79, to the interior of the bellows 75. The air pressure, $P_1$, in the input portion 68 at the through hole 73 is given by $$P_1 = P_o - \Delta Pf \tag{5}$$

where
Po = atmospheric pressure;
$\Delta Pf$ = pressure drop of the air as it passes through the silencer and filter.

As the air passes through the middle portion 69 of the passage 67, it is accelerated, and an additional air pressure drop occurs. The air pressure, $P_2$, in the output portion 70 of the passage 67 at the through hole 74 is given by $$P_2 = P_1 - \Delta p, \tag{6}$$

where
$P_1$ = air pressure in the input portion of the probe passage;
$\Delta p$ = pressure drop of the air after its passage of the middle portion of the nozzle; $\Delta p$ is proportional to the flow rate of the air passing through the sensor.

Thus, the air pressure $P_1$ is applied to the interior of the bellows 76 whereas the air pressure $P_2$ is applied to the interior of the bellows 75. The displacement of the clamp 78 is given by $$F_1 - F_2 = C \cdot h \tag{7}$$

where
$F_1$ = force proportional to the air pressure applied to the interior of the bellows 76;
$F_2$ = force proportional to the air pressure applied to the interior of the bellows 75;
C = reduced stiffness of both bellows;
h = clamp displacement.

If the effective areas are the same for the both bellows 75 and 76, the displacement, h, is given by $$h = \frac{F_1 - F_2}{C} = \frac{S(P_1 - P_2)}{C} = \frac{S}{C} \cdot \Delta p = \frac{S}{C} m\, Gc^2, \tag{8}$$

where S = effective area of one bellows.

Thus, the input signal of the air flow sensor 13 represents a displacement h of the clamp 78, is also proportional to the flow rate of the air passing through the air flow sensor 13 and does not depend upon the atmospheric pressure Po and the air pressure fall $\Delta P$ which can also increase during the operation of the power-plant.

The input signal representing a displacement h of the clamp 78 is fed through the input signal transmission line 24 to the input 22 of the comparison unit 20.

In other respects, the operation of the power-plant provided with the air flow sensor 13 according to this embodiment is similar to that described hereinabove.

The use of this power-plant in vehicles and vessels allows their capacity and efficiency to be materially increased, the size and weight to be reduced and, hence, the cost of these vehicles and vessels and their running expenses to be lowered.

Furthermore, in the power-plant described hereinabove, the air flow rate adjusting device and the air flow sensor are inexpensive, simple in construction and, hence, reliable in service, and can be readily and quickly adjusted to a desired compressor performance characteristic curve. At the same time these units can be unified for their use in power-plants comprising internal-combustion engines with various number of cylinders, whereas the comparison unit can be used in a power-plant with any internal-combustion engine.

While particular embodiments of the invention have been shown and described, various modifications thereof will be apparent to those skilled in the art. So, for example, the comparison unit 20 and the air flow sensor 13 can be made electrical. Therefore, it is not intended that the invention be limited to the disclosed embodiments or to the details thereof and departures may be made therefrom within the spirit and scope of the invention as defined in the appended claims.

What is claimed is:

1. A power-plant comprising:
   an internal-combustion engine;
   a turbo-charger providing the supercharging of said internal-combustion engine and having at least one turbine and one compressor, an inlet of said internal-combustion engine communicating with an outlet of said compressor of said turbo-charger, an inlet of said turbine communicating with an outlet of said internal-combustion engine;
   a by-pass duct communicating said outlet of said compressor with said inlet of said turbine;
   an auxiliary combustion chamber arranged in said by-pass duct; an air flow rate adjusting device for air by-passed from said compressor to said turbine, having a throttling member;
   a drive linked with said throttling member and providing variation of position of said throttling member in said by-pass duct;
   an air flow sensor installed at said inlet of said compressor; and
   a comparison unit having a first input, a second input and an output, said first input communicating with said by-pass duct between said outlet of said compressor and said air flow rate adjusting device, said second input communicating with said air flow sensor, and
   said output of said compression unit communicating with said drive for changing position of said throttling member.

2. A power-plant as claimed in claim 1, wherein said air flow sensor is made as a nozzle having a converging input portion of its passage, a through hole communicating with said second input of said comparison unit and made in a wall of said nozzle downstream of said input portion of said passage.

3. A power-plant as claimed in claim 1, wherein said air flow sensor comprises:
   a nozzle whose passage has an input portion, a converging middle portion; and an output portion;
   a silencer arranged in said input of said passage of said nozzle;
   a filter arranged in said input portion of said passage of said nozzle;
   two bellows;

an air supply assembly for supplying air to said two bellows, arranged between said bellows, connected to said nozzle, and having two passages, each of said passages of said air supply assembly communicating with the interior of one of said bellows;

a clamp embracing said bellows, each of said bellows having one end connected to said air supply assembly and another end fitted to said clamp;

a hole made in the wall of said nozzle upstream of said middle portion of said passage of said nozzle and communicating with one of said passages of said air supply assembly; and a hole made in a wall of said nozzle downstream of said middle portion of said passage of said nozzle and communicating with the other of said passages of said air supply assembly.

* * * * *